United States Patent
Kwon et al.

(10) Patent No.: US 9,047,710 B2
(45) Date of Patent: Jun. 2, 2015

(54) SYSTEM AND METHOD FOR PROVIDING AN AVATAR SERVICE IN A MOBILE ENVIRONMENT

(71) Applicant: NHN ARTS Corporation, Seoul (KR)

(72) Inventors: Seung Jo Kwon, Seongnam-si (KR); Yoonhee Seo, Seongnam-si (KR); Jiho Lee, Seongnam-si (KR)

(73) Assignee: Line Play Corporation, Seoul (KR)

(*) Notice: Subject to any disclaimer, the term of this patent is extended or adjusted under 35 U.S.C. 154(b) by 177 days.

(21) Appl. No.: 13/750,210

(22) Filed: Jan. 25, 2013

(65) Prior Publication Data

US 2013/0194280 A1    Aug. 1, 2013

(30) Foreign Application Priority Data

Jan. 27, 2012  (KR) .................. 10-2012-0008570

(51) Int. Cl.
*G06T 15/00*    (2011.01)
*G06T 13/40*    (2011.01)

(52) U.S. Cl.
CPC ............. *G06T 13/40* (2013.01); *G06T 15/00* (2013.01)

(58) Field of Classification Search
CPC ................................ G06T 13/40; G06F 15/00
USPC .......... 345/473, 474, 475; 715/706, 751, 756, 715/757
See application file for complete search history.

(56) References Cited

U.S. PATENT DOCUMENTS

| | | | |
|---|---|---|---|
| 6,910,186 B2* | 6/2005 | Kim .............................. | 715/706 |
| 7,342,587 B2* | 3/2008 | Danzig et al. ................ | 345/473 |
| 7,979,574 B2* | 7/2011 | Gillo et al. .................... | 709/238 |
| 8,047,915 B2* | 11/2011 | Lyle et al. ....................... | 463/31 |
| 8,108,774 B2* | 1/2012 | Finn et al. ..................... | 715/706 |
| RE44,054 E * | 3/2013 | Kim .............................. | 715/706 |
| 8,425,322 B2* | 4/2013 | Gillo et al. ..................... | 463/42 |
| 8,502,825 B2* | 8/2013 | Zalewski et al. .............. | 345/473 |
| 8,539,359 B2* | 9/2013 | Rapaport et al. .............. | 715/751 |
| 8,661,353 B2* | 2/2014 | Mattingly et al. ............. | 715/756 |
| 8,788,951 B2* | 7/2014 | Zalewski et al. .............. | 715/757 |

* cited by examiner

*Primary Examiner* — Phu K Nguyen
(74) *Attorney, Agent, or Firm* — Greer Burns & Crain, Ltd.

(57) ABSTRACT

Provided is an avatar service system and method for providing an avatar in a service provided in a mobile environment. The avatar service system may include a request receiving unit to receive a request for the avatar to perform an action, an image data selecting unit to select image data and metadata for body layers forming a body of the avatar in response to the request, and based on the selected body image data to further select image data for a plurality of item layers disposed on the body of the avatar, and an avatar action processing unit to generate action data for applying the action of the avatar based on the selected image data and metadata.

20 Claims, 26 Drawing Sheets

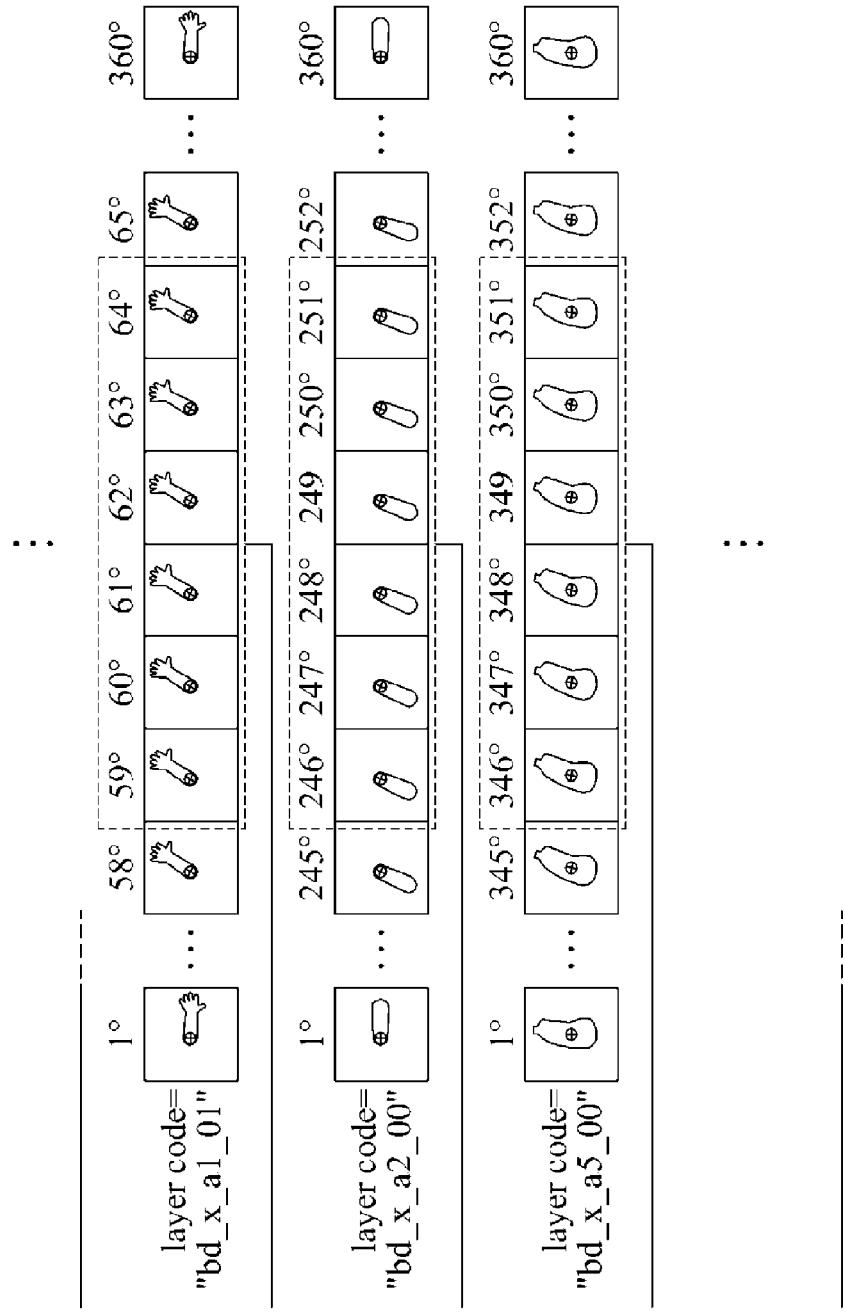

FIG. 6

```
ani01_xml
   ├─ scene frame="1"
   │     layer code="..."z_order="1"angle="0"offset_x="0"offset_y="0"/
   │     layer code="..."z_order="2"angle="0"offset_x="0"offset_y="48"/
   │     layer code="..."z_order="3"angle="0"offset_x="18"offset_y="8"/
   │                         ⋮
   │
   ├─ scene frame="2"
   │     layer code="..."z_order="1"angle="0"offset_x="0"offset_y="0"/
   │     layer code="..."z_order="2"angle="0"offset_x="0"offset_y="48"/
   │     layer code="..."z_order="3"angle="0"offset_x="18"offset_y="8"/
   │                         ⋮
   │
   ├─ scene frame="3"
   │     layer code="..."z_order="1"angle="0"offset_x="0"offset_y="0"/
   │     layer code="..."z_order="2"angle="0"offset_x="0"offset_y="48"/
   │     layer code="..."z_order="3"angle="0"offset_x="18"offset_y="8"/
   │                         ⋮
   │
   ⋮
```

| Gender | Male | Female | | Animal |
|---|---|---|---|---|
| Body | Body | | | Body |
| Basic Item | Male Face Shape | Common Face Shape | Female Face Shape | Animal Face Pattern |
| | Male Complexion | Common Complexion | Female Complexion | |
| | Male Eye | Common Eye | Female Eye | Animal Eye |
| | Male Eyebrow | Common Eyebrow | Female Eyebrow | |
| | Male Nose | Common Nose | Female Nose | Animal Nose |
| | Male Lip | Common Lip | Female Lip | Animal Lip |
| | Male Etc. | Common Etc. | Female Etc. | Animal Tail |
| | Male Hair | Common Hair | Female Hair | Animal Ear |
| Clothes Item | Male Upper Body | Common Upper Body | Female Upper Body | Animal Upper Body |
| | Male Lower Body | Common Lower Body | Female Lower Body | Animal Lower Body |
| | Male Whole Body | Common Whole Body | Female Whole Body | Animal Whole Body |
| | Male Shoe | Common Shoe | Female Shoe | Animal Shoe |
| | Male Accessory | Common Accessory | Female Accessory | Common Accessory / Animal Accessory |
| | Male Pet | Common Pet | Female Pet | Common Pet / Animal Pet |
| Action Item | Male Action | Common Action | Female Action | Animal Action |

2100

SYSTEM AND METHOD FOR PROVIDING AN AVATAR SERVICE IN A MOBILE ENVIRONMENT

CROSS-REFERENCE TO RELATED APPLICATION

This application claims priority from and the benefit of Korean Patent Application No. 10-2012-0008570, filed on Jan. 27, 2012, which is hereby incorporated by reference for all purposes as if fully set forth herein.

BACKGROUND

1. Field

Exemplary embodiments of the present invention relate to an avatar service system and method for providing an avatar in a service provided in a mobile environment.

2. Discussion of the Background

An avatar provided in a service through a wired and wireless network is configured by a combination of clothes, a face, and accessories. However, an avatar in a conventional art is stationary, or even when mobile, the avatar moves as a single unit irrespective of the combination of the clothes and accessories.

The avatar in the conventional art includes layers of clothing, a face, and accessories. When the avatar is configured by a combination of motionless images or is mobile, an issue of the clothes or accessories disappearing, that is, an issue of broken images arises. Also, an additional plug-in, for example, flash or "unity three-dimension (3D)" may need to be installed to implement an action of the avatar in an animation.

A messenger is an acquaintance-based service, and supports a text-based chat, absent an avatar. The messenger service adopts a format of representing a user by a predetermined image in lieu of an avatar.

BRIEF SUMMARY OF THE INVENTION

Exemplary embodiments of the present invention provide an avatar service system and method for storing and maintaining metadata for representing an action and a plurality of rotated images based on an action for a plurality of layers forming an avatar in a database, and for expressing various actions such as a motion, a facial expression, an emotion, and the like of the avatar by providing the metadata and the plurality of rotated images corresponding to the action in response to a request.

Exemplary embodiments of the present invention provide an avatar service system and method for resolving an issue of a broken image due to a rotated image and for improving an overall quality of the avatar service by forming additional item layers for items such as an accessory, clothes, and the like to be added to an avatar, as well as layers forming a body of the avatar, and by generating and maintaining a plurality of rotated images for a plurality of additional item layers to provide the plurality of rotated images for the plurality of additional item layers suitable for actions of layers forming the body.

Exemplary embodiments of the present invention provide an avatar service system and method for engaging an interest of a user by enabling the user to select an avatar in a chat service and by expanding a range of maximizing the avatar, for expressing various emotions of the user realistically through an action of the avatar rather than a static text-based chat, and for adding a sense of liveliness to a chat.

Exemplary embodiments of the present invention provide an avatar service system and method for providing users with a service that enables a random chat with other users through a random chat function, for verifying a previous chat or an action of an avatar through an additional chat log while using the avatar, and for adding a sense of liveliness to a chat by allowing the avatar to move.

Exemplary embodiments of the present invention provide an avatar service system and method for automatically expressing an action such as an emotion or a motion of an avatar by identifying a word among chat content, for providing a speech bubble subject to change according to the chat content, rather than an identical speech bubble, and for allowing a user to select the speech bubble of the user.

Additional features of the invention will be set forth in the description which follows, and in part will be apparent from the description, or may be learned by practice of the invention.

Exemplary embodiments of the present invention disclose an avatar service system for providing an avatar in a service provided in a mobile environment, the system including: a request receiving unit configured to receive a request for an avatar to perform an action; an image data selecting unit configured to select image data and metadata for body layers forming a body of the avatar from a database in response to the request, and based on the selected body image data configured to further select image data and metadata for item layers disposed on the body of the avatar from the database; and an avatar action processing unit configured to generate action data for applying the action to the avatar based on the selected image data and metadata.

Exemplary embodiments of the present invention disclose an avatar service method to be executed on a computer for providing an avatar in a service provided in a mobile environment, the method including: receiving a request for an avatar to perform an action; selecting, with the computer, image data and metadata for body layers forming a body of the avatar in response to the request, and based on the selected body image data further selecting image data and metadata with respect to item layers disposed on the body of the avatar; and generating action data for applying the action to the avatar based on the selected image data and metadata.

Exemplary embodiments of the present invention disclose an avatar service method performed by a terminal provided with an avatar in a service provided in a mobile environment, the method including: displaying an avatar on a screen; transmitting a request to a server for the avatar to perform an action; and receiving action data for the action of the avatar from the server, wherein in response to the request, the server selects image data and metadata for body layers forming a body of the avatar, and based on the selected body image data the server further selects image data and metadata for item layers disposed on the body of the avatar, and the server generates action data based on the selected image data for applying the action to the avatar.

Exemplary embodiments of the present invention disclose a non-transitory computer-readable storage media having stored thereon a computer program that, when executed by a terminal including a display and one or more processors, causes the one or more processors to perform acts that provide an avatar in a service in a mobile environment, the acts including: displaying an avatar on a screen; transmitting a request to a server for the avatar to perform an action; and receiving action data for the action of the avatar from the server, wherein in response to the request, the server selects image data and metadata for body layers forming a body of the avatar, and based on the selected body image data the server further selects image data and metadata for item layers disposed on the body of the avatar, and the server generates action data based on the selected image data for applying the action to the avatar.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 5 illustrates a process of extracting image data from a database according to exemplary embodiments of the present invention.

FIG. 6 illustrates metadata according to exemplary embodiments of the present invention.

FIG. 14 illustrates an item category structure of an avatar according to exemplary embodiments of the present invention.

DETAILED DESCRIPTION OF THE ILLUSTRATED EMBODIMENTS

Figure 1:
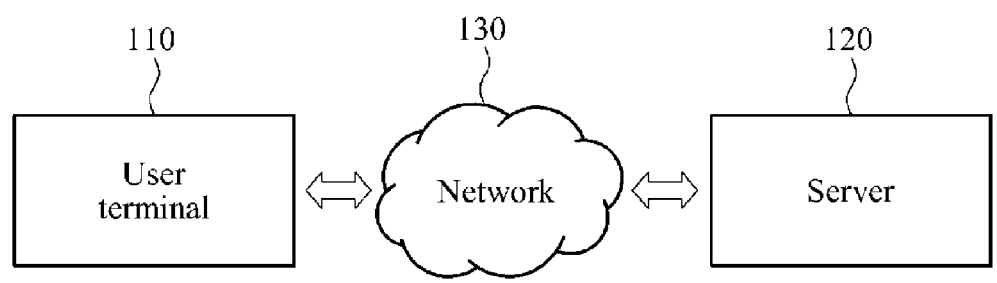
FIG. 1 illustrates an environment in which a terminal and a server are connected through a network according to exemplary embodiments of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In addition, embodiments described in the specification are wholly hardware, and may be partially software or wholly software. In the specification, "unit", "module", "device", "system", or the like represents a computer related entity such as hardware, combination of hardware and software, or software. For example, in the specification, the unit, the module, the device, the system, or the like may be an executed process, a processor, an object, an executable file, a thread of execution, a program, and/or a computer, but are not limited thereto. For example, both of an application which is being executed in the computer and a computer may correspond to the unit, the module, the device, the system, or the like in the specification.

Hereinafter, exemplary embodiments of the present invention will be described in detail with reference to the accompanying drawings.

It will be understood that when an element is referred to as being "connected to" another element, it can be directly connected to the other element, or intervening elements may be present.

FIG. 1 illustrates a terminal and a server connected through a network according to exemplary embodiments of the present invention. A terminal 110 and a server 120 are connected via a network 130.

The terminal 110 may be a wired communication terminal or a wireless communication terminal. The terminal 110 may communicate with the server 120 through the network 130 using a communication module included in the terminal 110. For example, when the terminal 110 is the wireless communication terminal, the network 130 may be a wireless communication network using a base station, a gateway, and the like, or may be a wireless communication network for connecting to the Internet using an access point. When the terminal 110 is the wired communication terminal, the network 130 may be a wired communication network connected to the Internet using a local area network (LAN). Further descriptions of the wireless and wired communication network will be omitted since such communication technologies are well known in the field of the present invention.

The server 120 may be a system for providing an avatar service, a chat service, an avatar service in a social networking service (SNS), a social network game (SNG) service, or a combination thereof to the terminal 110. The server 120 may provide an avatar service to the terminal 110, and the avatar service may provide an avatar allowing various actions for a plurality of layers used for combining avatars. For example, the server 120 may be a system for providing the chat service using an avatar to the terminal 110. The server 120 may support realistic expression of emotions of a user through an avatar by enabling various avatar actions.

Figure 2:
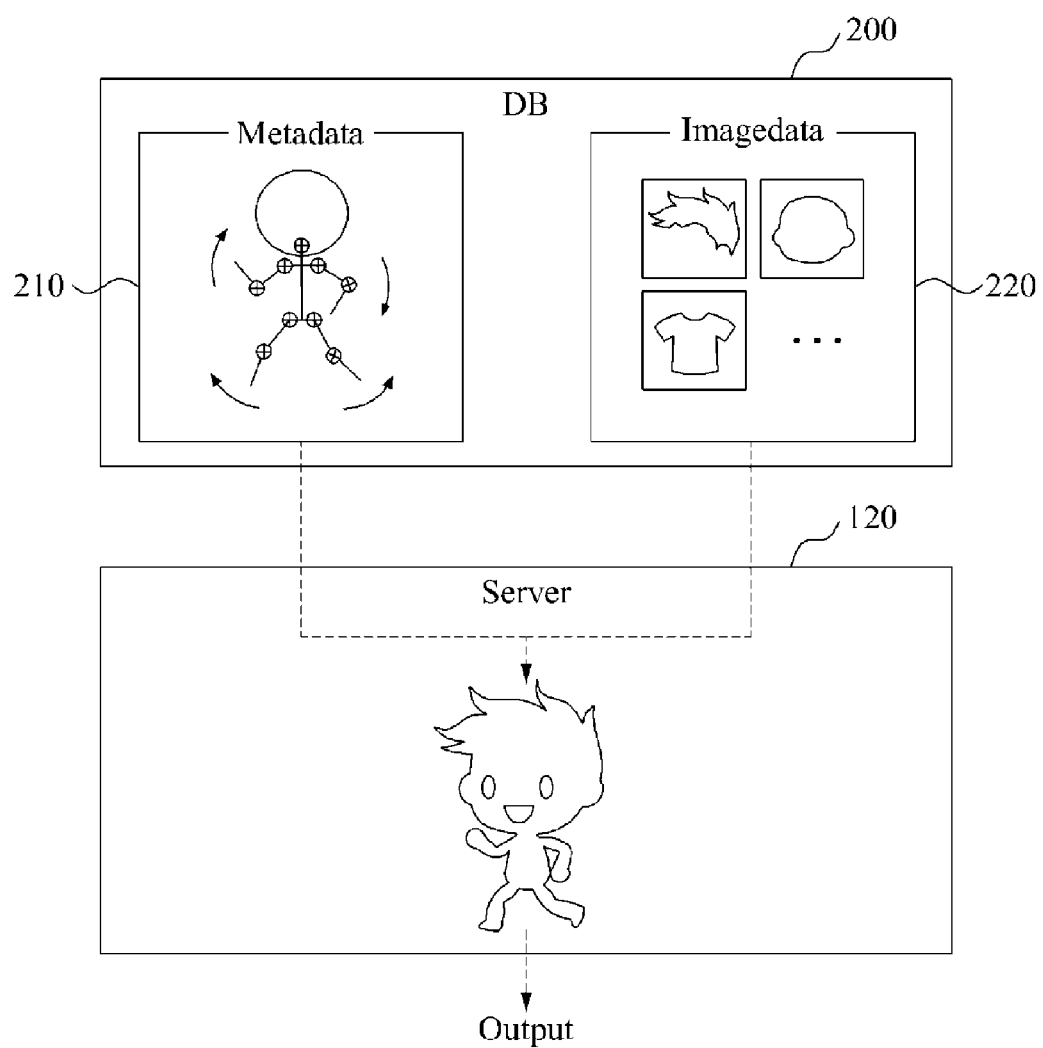
FIG. 2 illustrates a database according to exemplary embodiments of the present invention.

FIG. 2 illustrates a database according to exemplary embodiments of the present invention. A database 200 may enable various actions of an avatar to be performed and may store and maintain metadata 210 with respect to an action of an avatar, and image data 220 for a plurality of layers for forming an avatar. The database 210 may be included in the server 120, or included in an additional system that provides data to the server 120. The server 120 may extract the metadata 210 and the image data 220 necessary from the database 200 to provide the extracted metadata 210 and the image data 220 to the terminal 110 of FIG. 1. For example, the server 120 of FIG. 2 may compose the image data 220 for a plurality of frames based on the metadata 210, and provide a composed animation to the terminal 110. The server 120 may provide the extracted metadata 210 and the image data 210 to the terminal 110, and may compose the image data 220 based on the metadata 210 on the terminal 110 to display the plurality of frames. The avatar service system and method may represent an avatar of various actions through a scheme of composing the image data 220 for a plurality of layers based on the metadata 210.

Figure 3:
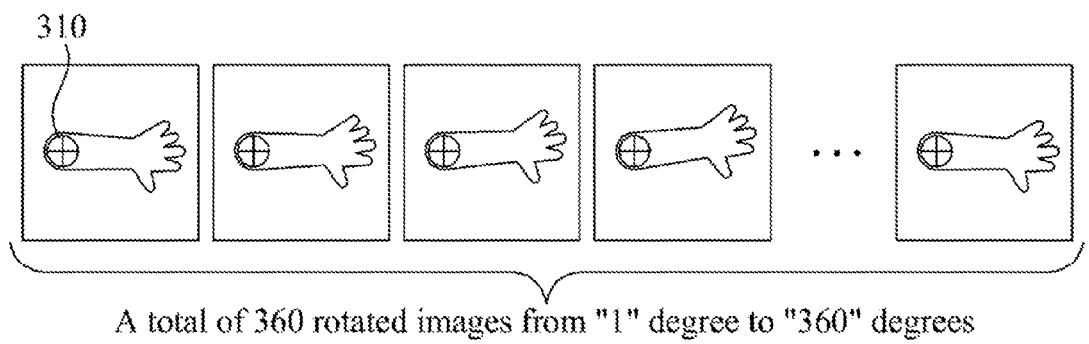
FIG. 3 illustrates image data for a plurality of layers according to exemplary embodiments of the present invention.

FIG. 3 illustrates image data for a plurality of layers according to exemplary embodiments of the present invention. FIG. 3 illustrates rotated images showing an object that is rotated about an imaginary central axis 310. Each of the images is from a fixed viewpoint. The rotated images can be generated by either rotating the object or the camera. The images can be generated by drawing, for example, with a computer, an artist, or a combination thereof. The images can be fixed images of a layer, where each image is from a different viewing angle about an imaginary axis. For example, 360 rotated images may be generated over a range of zero degrees to 360 degrees, based on the central axis 310 for a single layer, in a rotation unit of 1 degree. The rotation unit may be to a different value, for example, 2 degrees, 5 degrees, or the like. Central axis 310 is illustrated as a cross-hair and represents an axis perpendicular to the view of FIG. 3.

Figure 4:
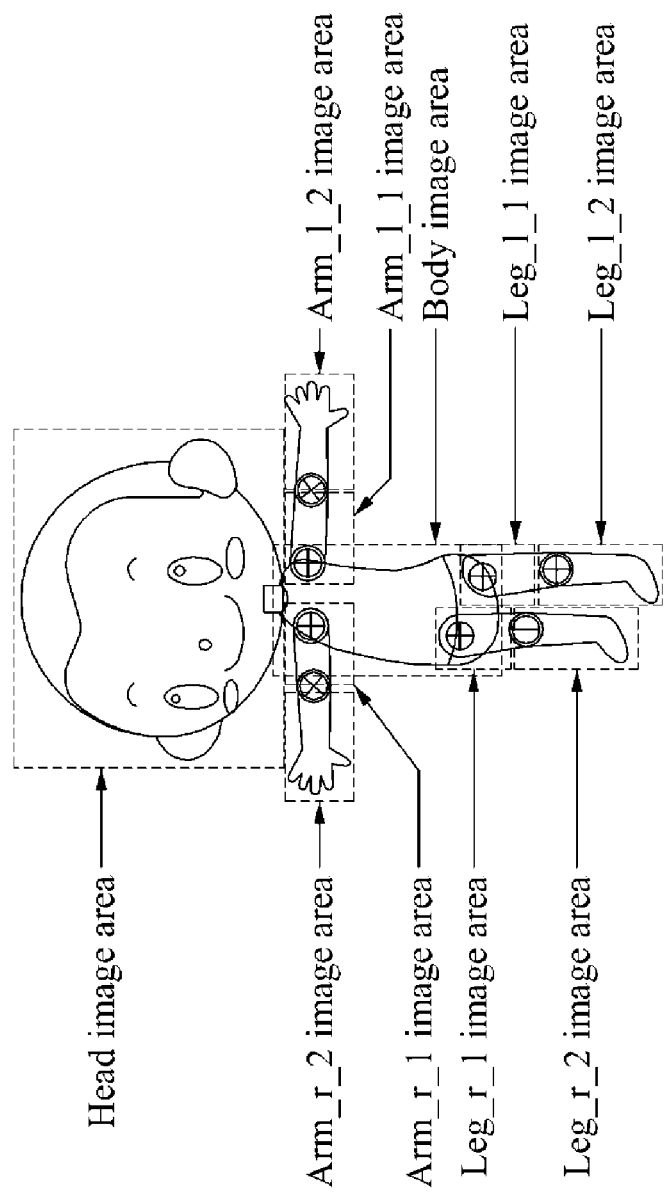
FIG. 4 illustrates layers forming a body of an avatar to perform an action of the avatar according to exemplary embodiments of the present invention.

FIG. 4 illustrates layers forming a body of an avatar for an action of the avatar according to exemplary embodiments of the present invention. The body of the avatar may be divided into many layers. For example, the avatar of FIG. 4 can include ten (10) layers including a head (Head image area), a torso (Body image area), an upper right arm (Arm_r_1 image area), a lower right arm (Arm_r_2 image area), an upper left arm (Arm_l_1 image area), a lower left arm (Arm_l_2 image area), an upper right leg (Leg_r_1 image area), a lower right leg (Leg_r_2 image area), an upper left leg(Leg_l_1 image area), and a lower left leg(Leg_l_2 image area). The layers may each include a central axis, and may be rotated based on the central axis. The avatar may include or may be divided into more or less layers. The avatar can be divided into more layers to provide a more detailed motion to the avatar.

FIG. 5 illustrates a process of extracting image data from a database according to exemplary embodiments of the present invention. FIG. 5 illustrates 360 rotated images for each of a plurality layers may be stored in the database as image data. The rotated images may be extracted and provided for expressing a requested action. In the exemplary database of FIG. 5, the 360 rotated images may be stored from 1 degree to 360 degrees in a unit of one degree for the plurality of layers. "Layer code" may be an identifier to identify the particular layer from the plurality of layers associated with the image. FIG. 5 illustrates extracting rotated images including a range of 59 degrees to 64 degrees (illustrated by the dashed boxes) from among rotated images of a layer including rotated images ranging from 0 degrees to 360 degrees. Exemplary layers in FIG. 5 are named "bd_x_a1_01," "bd_x_a2_00" and "bd_x_a5_00."

The plurality of layers may be rotated about the central axis based on an application of a rotated image, and the plurality of layers may be moved based on a location of the central axis on a screen. Information on the rotation of the plurality of layers or the location of the central axis of the plurality of layers may be included in metadata. For example, for the plurality of layers the metadata may include information, such as, coordinates, coordinates of the location the central axis of the rotated image, the rotated images angle, a rotation value.

FIG. 6 illustrates metadata according to exemplary embodiments of the present invention. An exemplary structure "ani01.xml" may provide the metadata in a form of an extensible markup language (XML). The structure name "ani01.xml" can be an identifier of a requested action. A value of "scene frame" may be an identifier for identifying a frame. "Scene frame=1" may be a first frame of a corresponding action. "Layer code" may be an identifier for identifying a layer as described in the preceding. An identifier "z_order" may correspond to a depth of layers in a frame. For example, as a value of "z_order" increases, a layer may be displayed at a front of a screen. An identifier "angle" may correspond to a rotated image to be applied. For example, "angle=0" may indicate that a rotated image corresponding to 360 degrees may be applied. Identifiers "offset_x" and "offset_y" may indicate coordinates. Such coordinates may be absolute coordinates corresponding to the coordinates of the screen, and may also be relative coordinates with respect to a standard location of an area in which an avatar is represented.

Referring to FIGS. 1 and 2, when the terminal 110 is provided with an avatar service by connecting to the server 120 through the network 130, the server 120 may receive a request associated with an action of an avatar from the terminal 110. The server 120 may compose an image of an avatar with a requested action to provide the composed image to the terminal 110.

In exemplary embodiments of the present invention, the server 120 may extract the metadata 210 and the image data 220 associated with the action requested from the database 200 to provide the extracted metadata 210 and the extracted image data 220 to the terminal 110. The server 120 may display the image data 220 for a plurality of frames based on the metadata 210 on the terminal 110. For example, the metadata 210 may be provided through a wired and wireless network in the form of XML as described in FIG. 6. The server 120 may generate an XML file using the metadata 210 and the image data 220 to provide the generated xml file to the terminal 110. The server 120 may add a network address for the image data 220 to the XML file provided to the terminal 110. The terminal 110 may process the XML file through a standard network protocol, such as, a Hyper Text Markup Language (HTML) 5. The image data 220 may be provided to the terminal 110 through the network address added to the XML file.

Figure 7:
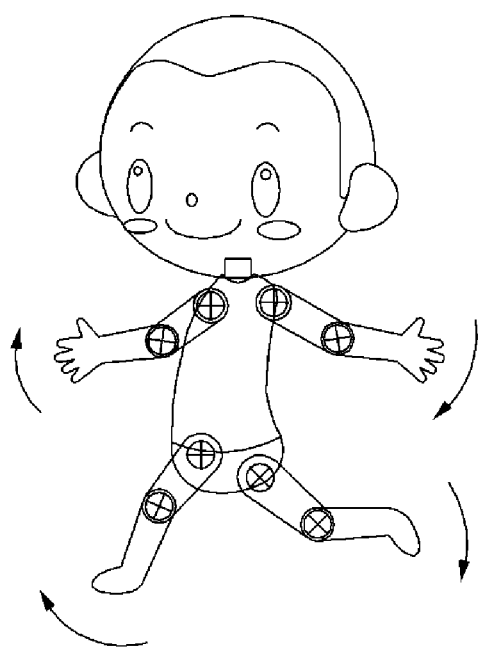
FIG. 7 illustrates an action of an avatar according to exemplary embodiments of the present invention.

FIG. 7 illustrates an action of an avatar 700 according to exemplary embodiments of the present invention. The action of the avatar 700 may be determined based on coordinates and a rotation value of layers forming the avatar 700. The coordinates and the rotation value of rotated images of the layers may be determined for a plurality of frames, and when the plurality of frames are displayed on a screen in succession, an animation based on the action of the avatar 700 may be provided to a user. Also, the location of the avatar 700 may be moved by uniformly changing all coordinates values forming the avatar. Exemplary arrows included in FIG. 7 indicate some of the rotations of various layers that are feasible, such as, rotations of the lower arms and/or lower legs. Not shown in FIG. 7 are illustrations of movements of other layers of avatar 700, for example, the head, the body, the upper arms, the upper legs.

Figure 8:
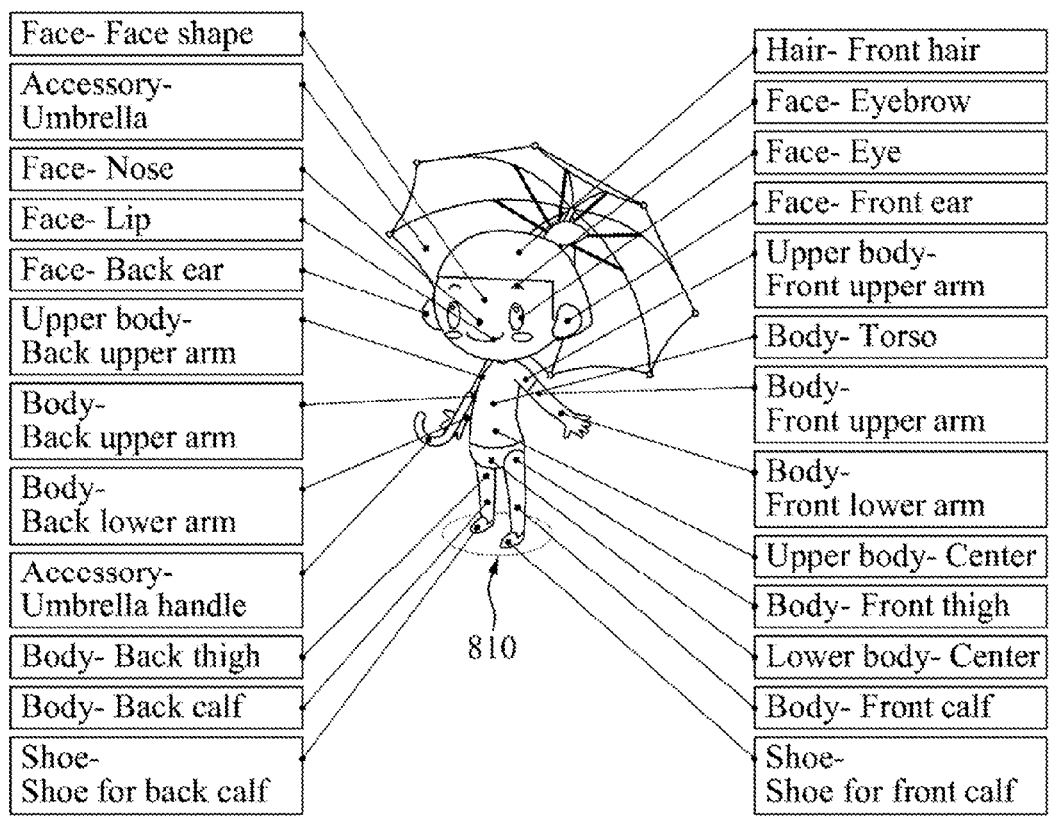
FIGS. 8 and 9 illustrate a front and a back of an avatar including a plurality of layers according to exemplary embodiments of the present invention.
Figure 9:
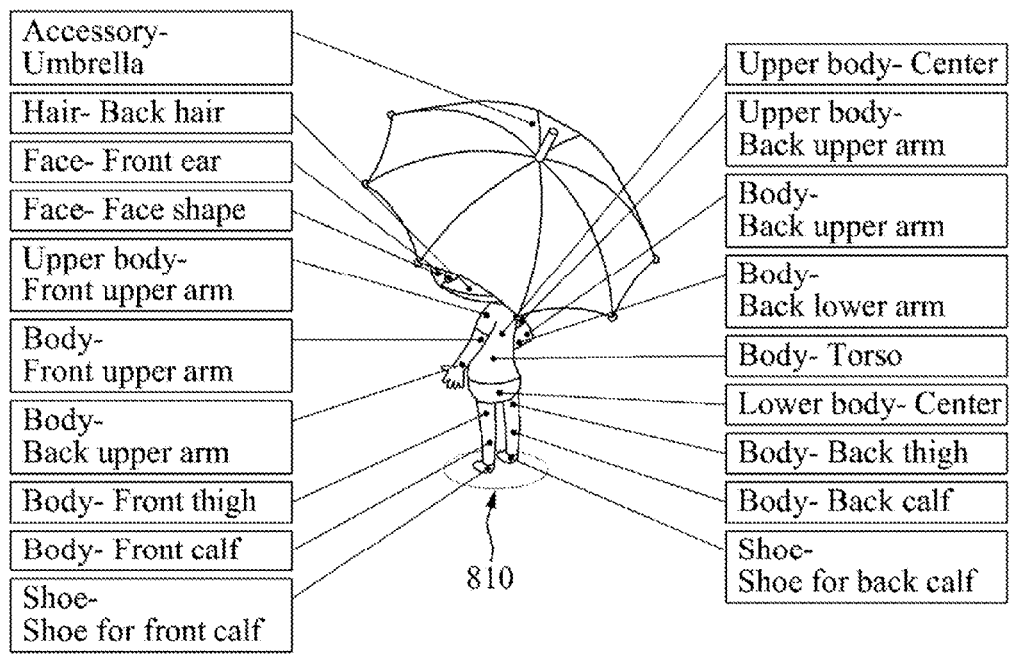

FIGS. 8 and 9 illustrate a front and a back, respectively, of an avatar including a plurality of layers according to exemplary embodiments of the present invention. FIGS. 8 and 9 are examples in which an exterior of the avatar is provided in a form of a layer structure. FIGS. 8 and 9 are examples in which an exterior of the avatar is provided in a form of a layer structure. A central axis may be for a plurality of layers, and a plurality of rotated images may exist based on the central axis for a single layer. The plurality of rotated images may be stored as the image data 220 for the plurality of layers in the database 200 as described in the preceding. The plurality of rotated images may exist for the plurality of layers, respectively, and the server 120 may provide rotated images and metadata required for an action of the avatar. As described in the foregoing, the terminal 110 may display the rotated images by combining the rotated images based on the metadata. The layers visible in the front view of FIG. 8 can be named, for example: face-face shape, accessory-umbrella, face-nose, face-lip, face-back ear, upper body-back upper arm, body-back upper arm, body-back lower arm, accessory-umbrella handle, body-back thigh, body-back calf, shoe-shoe for back calf, hair-front hair, face-eyebrow, face-eye, face-front ear, upper body-front upper arm, body-torso, body-front upper arm, body-front lower arm, upper body-center, lower body-center, body-front calf, shoe-shoe for front calf. The layers visible in the back view of FIG. 9 can be named, for example: accessory-umbrella, hair-back hair, face-front ear, face-face shape, upper body-front upper arm, body-front upper arm, body-back upper arm, body-front thigh, body-front calf, shoe-shoe for front calf, upper body-center, upper body-back upper arm, body-back lower arm, body-torso, lower body-center, body-back thigh, body-back calf, shoe-shoe for back calf.

Figure 10:
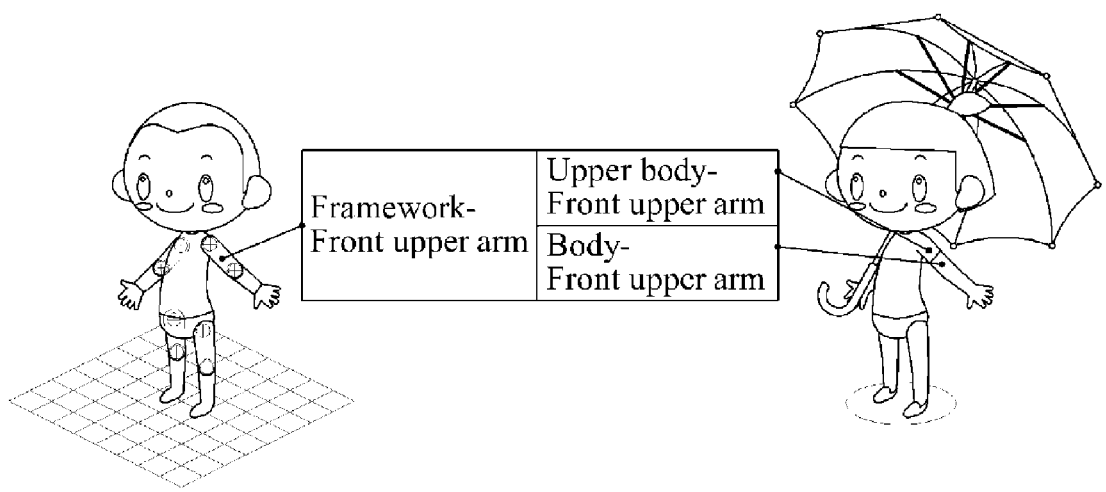
FIG. 10 illustrates a body layer and item layers corresponding to a framework layer displaying a framework of an avatar according to exemplary embodiments of the present invention.

FIG. 10 illustrates a body layer and item layers corresponding to a framework layer displaying a framework of an avatar according to exemplary embodiments of the present invention. The avatar may indicate that a body disposed within the framework and other items disposed within the framework may move simultaneously based on an action of the framework. A layer representing the framework may change coordinates and an angle of the body layer and the item layer corresponding to coordinates and an angle to which the body layer and the item layer are moved, such that an issue of a broken image may be prevented. For example, as illustrated, the framework "Framework—Front upper arm" has disposed with it a body "Body-Front upper arm" and an item "Upper body-Front upper arm."

Figure 11:
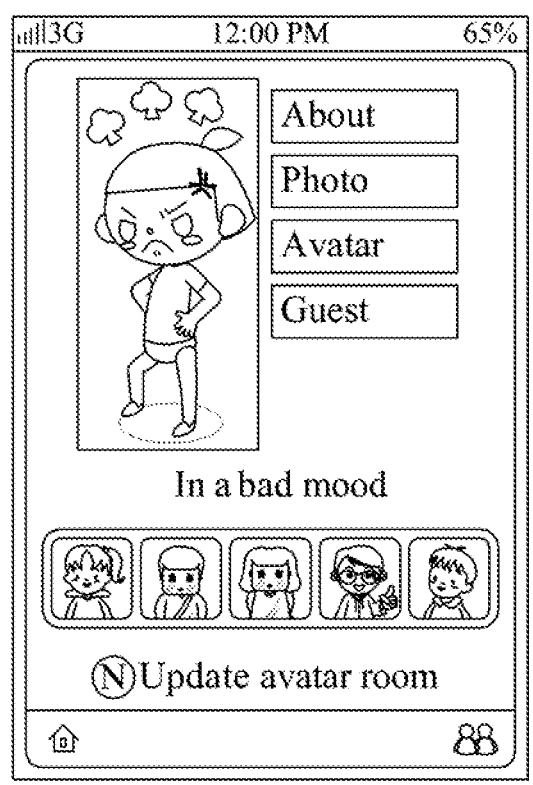
FIG. 11 illustrates an avatar service provided on a mobile network according to exemplary embodiments of the present invention.

FIG. 11 illustrates an avatar service provided via a mobile network according to exemplary embodiments of the present invention. A screen 1100 is an example illustrating a screen of a mobile terminal. The screen 1100 is an example in which an avatar is set for a representative profile image of an SNS, in lieu of a photo of a user. The avatar may express an emotion or a state of the avatar by an action of the avatar, such as, a facial expression, a body motion, and the like.

Figure 12:
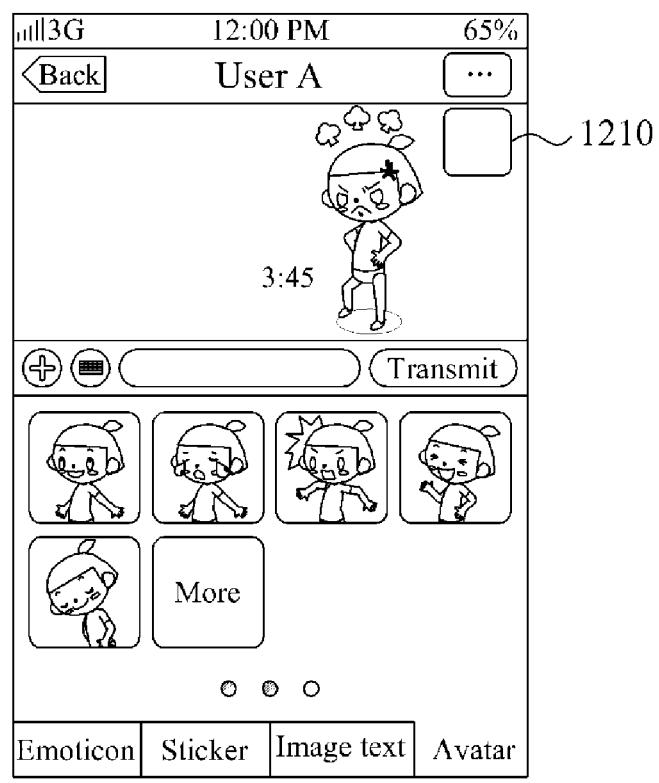
FIG. 12 illustrates an avatar service provided on a mobile network according exemplary embodiments of the present invention.

FIG. 12 illustrates an avatar service provided via a mobile network according to exemplary embodiments of the present invention. A screen 1200 is an example of a chat service using an avatar. An emotion, a state, and the like of a user may be transmitted to another user through an action of the avatar, as well as through a text-based chat. Actions of the avatar may be provided in advance, and a selected action from among the provided actions may be reflected in the avatar of the user. The action of the avatar may be selected in various manners. For example, the action of the avatar may be selected by analyzing a text input by the user.

In the exemplary embodiments of the present invention, as shown in FIGS. 11 and 12, an avatar can express various actions and facial expressions without installing an additional program, for example, a plug-in, may be supported on a wired and wireless network. The avatar service that enables the action of the avatar may be provided in a mobile network service.

Referring to FIG. 12, when an item is disposed on the avatar, an action of the avatar may be applied to a corresponding item. When the avatar moves, items such as clothes, accessories, and the like, disposed on the avatar may move or rotate in a manner corresponding to the action of the avatar to prevent an issue of a broken image.

In the chat service according to exemplary embodiments of the present invention, a profile image of a user may be displayed together with a profile image 1210 of another user in an area in which a chat log is displayed.

Figure 13:
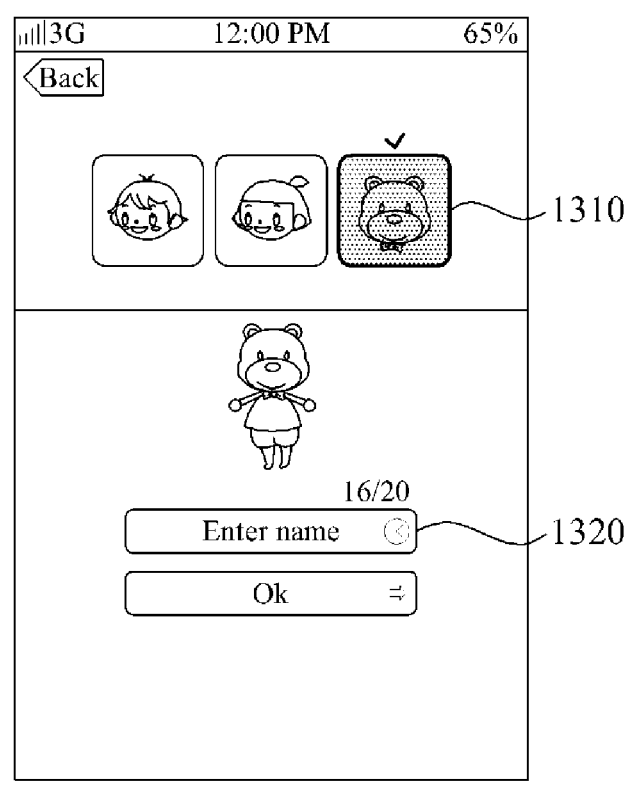
FIG. 13 illustrates an animal-shaped avatar is provided according to exemplary embodiments of the present invention.

FIG. 13 illustrates an animal-shaped avatar provided according to exemplary embodiments of the present invention. FIG. 13 illustrates a first user interface 1310 through which an animal-shaped avatar, a human male avatar and a human female avatar may be selected. A second user interface 1320 allows a user to set a name of the selected avatar. The user interfaces may be provided to the user through an application installed on a user terminal.

FIG. 14 illustrates an item category structure of an avatar according to exemplary embodiments of the present invention. An avatar system may assign a gender to the avatar. The avatar system may generate a species avatar, such as, a human avatar, an animal avatar, or the like, by assigning a species property, that is, an animal characteristic, aside from the gender property. A virtual species may be added as the species property. An individual element may be changed or put on the avatar using various items set, such as, an appearance, clothes, and the like, and a user may control an action of the avatar.

The application described in FIG. 13 may include at least one or more of exemplary user interfaces (not shown). For example, user interfaces (1) to (7) are described below and may be combined with each other.

The application can include a wardrobe interface (1) for identifying items or actions provided to a user, or items or actions purchased by the user. The items may include items of a face shape, an eyebrow, an eye, a nose, lips, hair, or a complexion to form a face of an avatar. The items may include clothes, accessories, or items for a pet. The pet may have a dedicated set of actions, and may also be able to move. The wardrobe interface may display items by distinguishing the items into wearable and non-wearable based on the gender or the species of the avatar. Items or actions attributable to an avatar may be provided by category.

The application can include a combination interface (2) for providing a preview of various combined items.

The application can include an avatar rotating interface (3) for rotating an avatar. A user may rotate the avatar using the avatar rotating interface, and identify the avatar combined through the combination interface.

The application can include a random combination interface (4) for combining items at random. For example, when the random combination interface is selected from a highly ranked category, an application may select items at random from among all items of subcategories of the high rank category to combine the selected items. As another example, when the random combination interface is selected subsequent to being admitted into a category, an application may select items at random from among items of corresponding category to combine the selected items. The random combination interface may further include a function of combining items at random from among items held by a user, or a function of combining items at random from among items for sale.

The application can include an item purchase interface (5) for purchasing items such as clothes or accessories. The item purchase interface may include the combination interface (2) described above. Users may combine items to an avatar of the users prior to purchasing the items. The item purchase interface may further include a shopping basket interface to store selected items. The items stored through the shopping basket interface may be combined automatically in advance in the avatar of the users. A set duration for usage may be assigned to the items purchased.

The application can include an action purchase interface (6) for purchasing an action able to be performed by an avatar combined with clothes. For example, a user may purchase and use an additional action aside from a basic action provided. The action purchase interface may include a pre-purchase action performance interface to provide instructions to an avatar of a user for performing a selected action prior to purchasing the action. An application may play an animation in which the avatar of the user performs an action prior to purchasing the action to show the animation to the user.

The application can include a user interface (7) for gifting an item or an action to a user. An item held by a user may be deleted through a deletion function. When an item is deleted, a number of rewards may be provided to the user for at least a portion of items, by introducing a concept of recycling.

Figure 15:
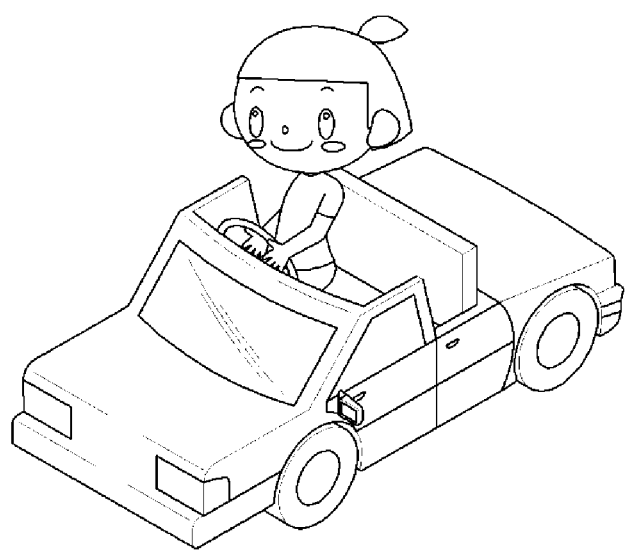
FIG. 15 illustrates an avatar represented in a vehicle according to exemplary embodiments of the present invention.

FIG. 15 illustrates an avatar represented in a vehicle according to exemplary embodiments of the present invention. The mobile device may be included as an item to be combined to the avatar. As described in the preceding, the avatar may be able to move, and for example, may change a location based on an action of the avatar or an input of a user in a chat stage such as a chat window or a chat room. The avatar represented in the vehicle may move in the chat stage. As used herein, the "chat window", the "chat room", and the "chat stage" may be used to refer to the same chat environment.

Referring to FIGS. 1 and 2, the server 120 may extract the metadata 210 and the image data 220 necessary from the database 200 in response to a request transmitted from the terminal 120. The request may be generated through a control of an application installed in the terminal 120.

The server 120 may generate a necessary animation using the extracted metadata 210 and the extracted image data 220, and transmit the animation to the terminal 120. The terminal 120 may display the animation on a corresponding service screen, such as a chat window, based on the control of the application.

The server 120 may store and maintain the generated animation for a duration. When the requested animation is stored in advance, the server 120 may transmit the stored animation to the terminal 120 in response to the request. The server 120 may extract data from the database 200, and generate an animation when the animation is not stored.

Figure 16:
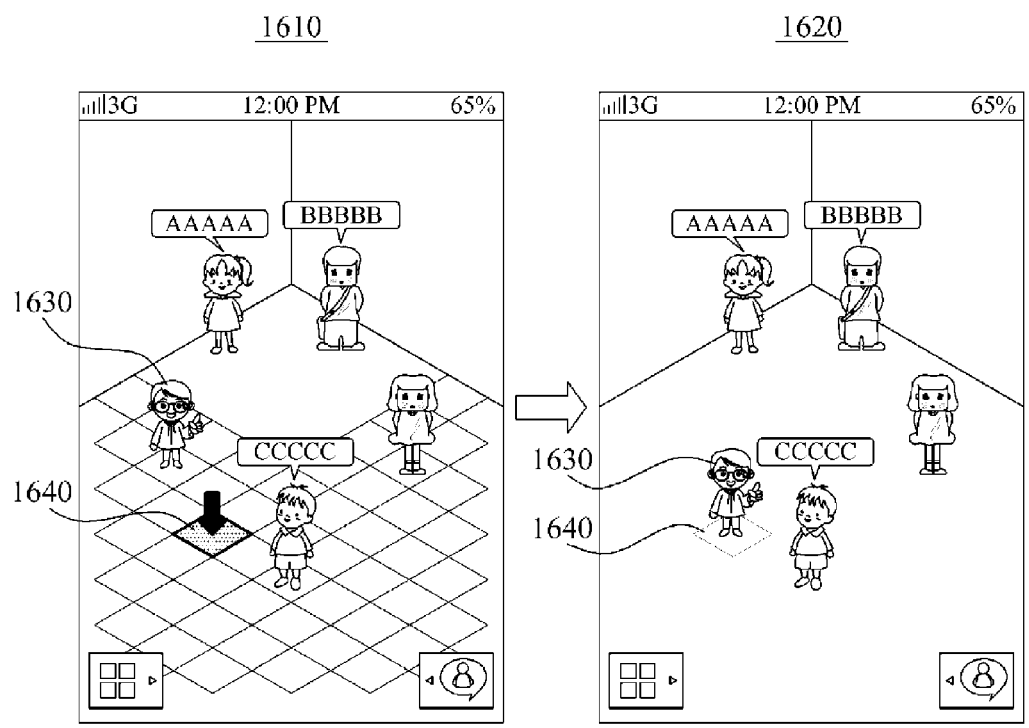
FIG. 16 illustrates a chat stage according to exemplary embodiments of the present invention.

FIG. 16 illustrates a chat stage according to exemplary embodiments of the present invention. A first screen 1610 and a second screen 1620 are examples of a screen of a mobile terminal. The first screen 1610 may display avatars of a plurality of users in a chat room to which the plurality of users are connected. The first screen 1610 may display the avatars above the chat content. A user may move an avatar 1630 by setting a location 1640 to which the avatar 1630 of the user is to be moved. The second screen 1620 may display that the avatar 1630 is moved to the location 1640 set by the user. The location of the avatar 1630 may be moved by integrally adjusting coordinates of a central axis of rotated images forming the avatar 1630. For example, the terminal 110 may transmit coordinates to which the avatar 1630 is to be moved to the server 120, when the terminal 110 requests the server 120 to move the avatar 1630. The server 120 may control movement of the avatar 1630 using the received coordinates. The server 120 may transmit the changed location information of the avatar 1630 to other users participating in a chat. The location of the avatar 1630 may also be changed on screens of terminals of the other users upon receiving the changed coordinates from server 120.

According to the exemplary embodiments of the present invention, a user may express various emotions realistically through an action of an avatar. An avatar service may be reflected in a social networking service (SNS) or social network game (SNG) as well as a chat service. In the chat service, an interest may be attracted from a user by enabling the user to select an avatar and by expanding a range for maximizing the avatar, and a sense of liveliness may be provided to a chat through a movement of the avatar in a chat window, rather than simply a static text-based chat.

Figure 17:
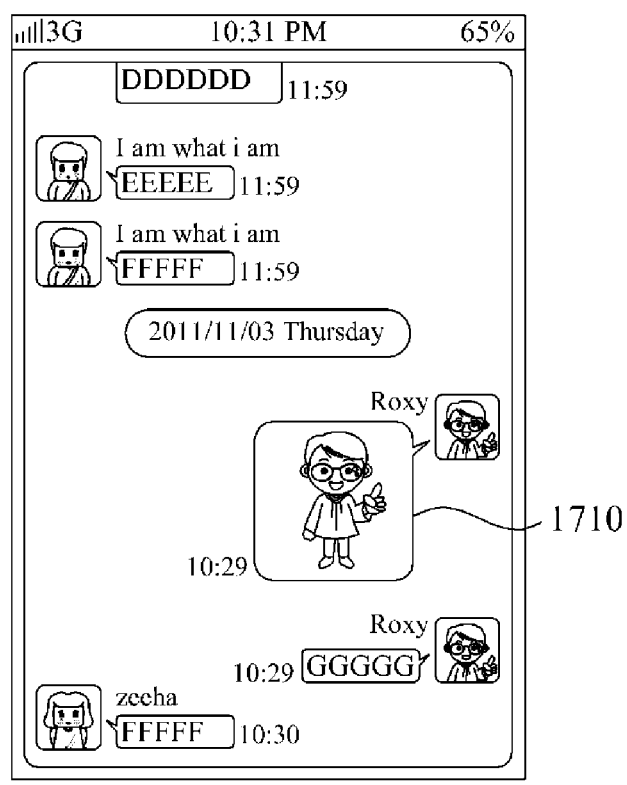
FIG. 17 illustrates a chat log according to exemplary embodiments of the present invention.

FIG. 17 illustrates a chat log according to exemplary embodiments of the present invention. When a chat is performed using a chat stage and avatars, for example, as shown in FIG. 16, an application may include an additional chat log viewing interface. A screen 1700 is an example of a screen of a mobile terminal, and illustrates the chat log being displayed. The chat log may include a text input by users for chatting, and an action 1710 such as an emotion, a motion, and the like, of an avatar.

Figure 18:
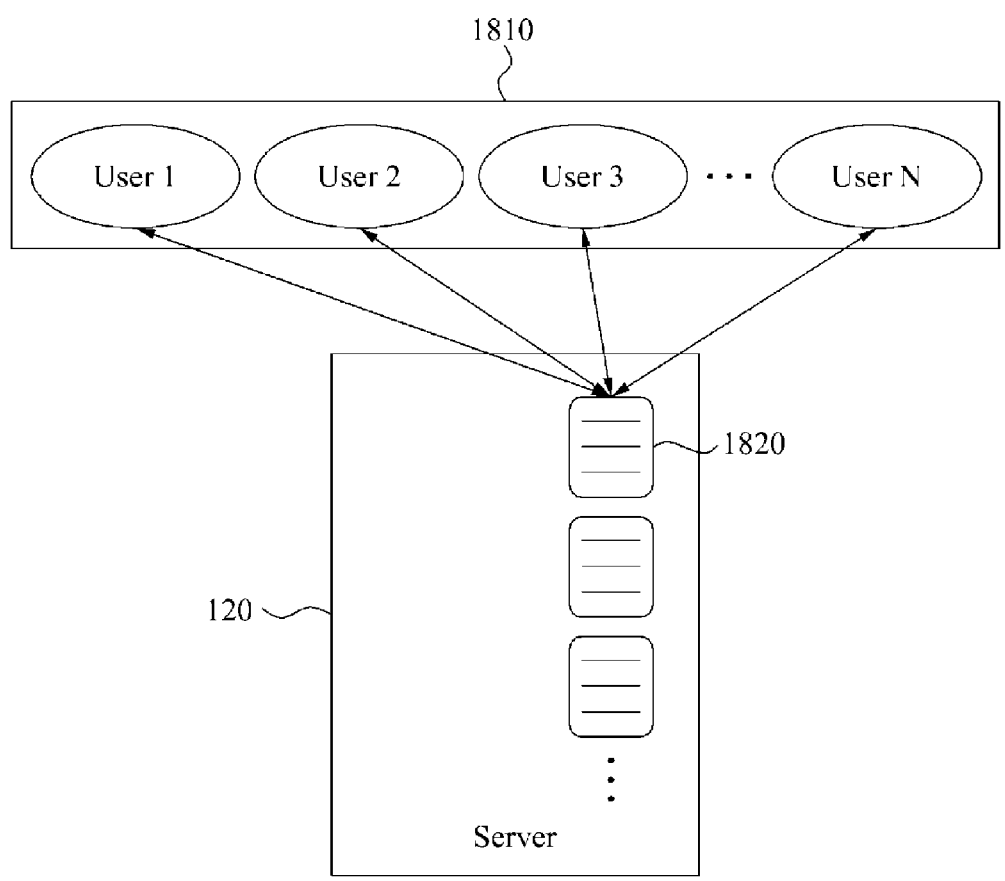
FIG. 18 illustrates a method for providing a chat log according to exemplary embodiments of the present invention.

FIG. 18 illustrates a method for providing a chat log 1820 according to exemplary embodiments of the present invention. When an N number of users are connected to a single chat room or a chat stage 1810, the server 120 may generate the chat log 1820 with respect to the chat stage 1810. The server 120 may record information on text transmitted from terminals of users or an action of an avatar in the chat log 1820. When a user selects a chat log viewing interface, the server 120 may provide the chat log 1820 to the corresponding terminal. The terminal receiving the chat log 1820 may allow a user to identify an action of the avatar as shown on the screen 1700 of FIG. 17 by displaying the received chat log 1820 on a screen.

Figure 19:
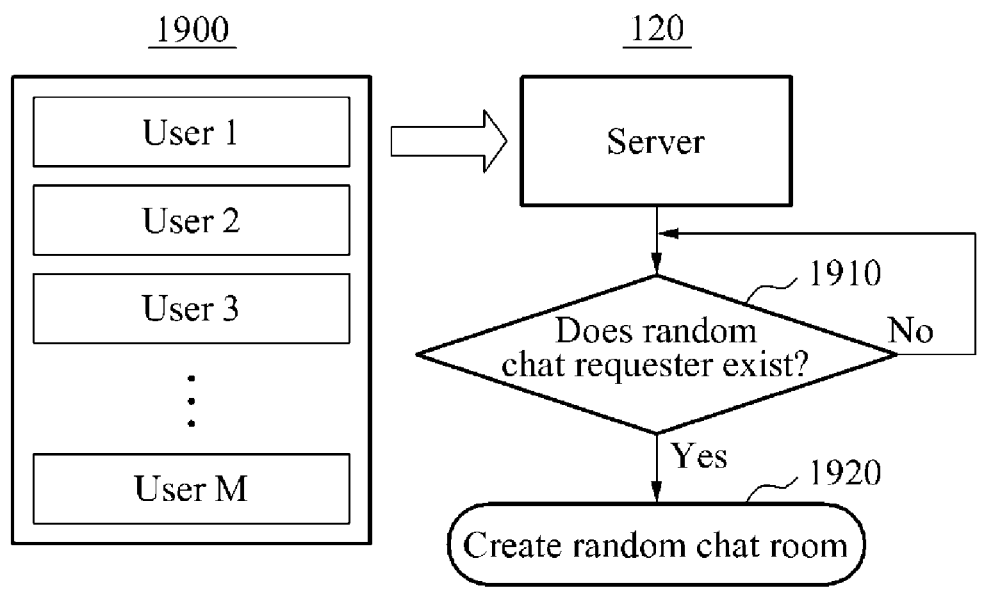
FIG. 19 illustrates a random chat function according to exemplary embodiments of the present invention.

FIG. 19 illustrates a random chat function according to exemplary embodiments of the present invention. The server 120 may identify users requesting a random chat from among a plurality of users 1900 using the chat service. In operation 1910, the server 120 may verify an existence of a requester for the random chat. In operation 1920, when the requester is verified to exist in the chat service (YES), a random chat room may be created. When the requester is verified to be non-existent in the chat service (NO), the server 120 may pause and perform operation 1910. The server 120 may admit users to the random chat room based on a sequential order of the request for the random chat, and may control a number of users admitted to a single random chat room. The server 120 may support random chat between the users requesting random chat at a similar timing (on or about the same time). When the number of requesters for the random chat is at least two in operation 1910, the server 120 may create the random chat room in operation 1920.

Figure 20:
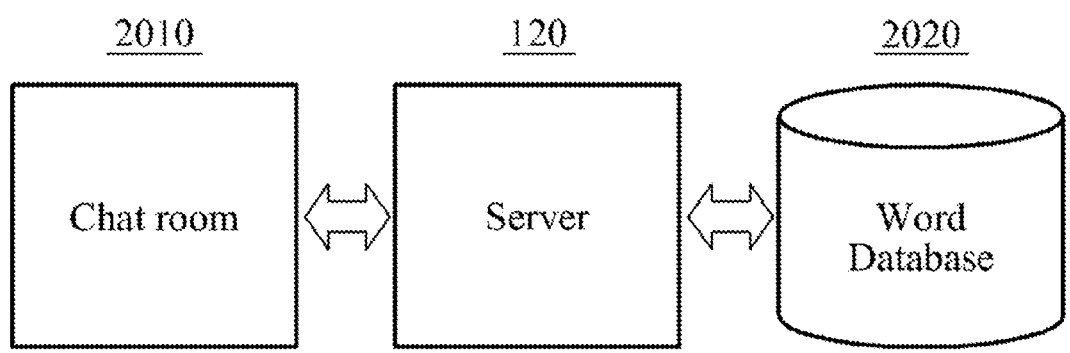
FIG. 20 illustrates a chat room, a server, and a word database according to exemplary embodiments of the present invention.

FIG. 20 illustrates a chat room, a server, and a word database according to exemplary embodiments of the present invention. The server 120 may transmit chat content received from terminals of users admitted to a chat room 2010 to terminals of all users present in the chat room 2010. The server 120 may process an action of an avatar in response to a request received from the terminals of the users admitted to the chat room 2010 for the avatar to perform the action. The server 120 may transmit a result of the processing of the action of the avatar to the terminals of all the users present in the chat room 2010.

The server 120 may include a word database 2020 or may use the word database 2020 in interaction with an additional system including the word database 2020. A word that associates an action tag with an action of an avatar may be stored in the word database 2020. The server 120 may verify the action tag of the associated avatar by searching for a corresponding word in the word database 2020 when the stored word included in the word database 2020 is included in the chat content generated in the chat room 2010.

For example, a word "smile" may be stored in association with an action tag "smiley face" in the word database 2020. When the word "smile" exists in chat content of a user A present in the chat room 2010, the server 120 may verify the action tag "smiley face" through the word database 2020. The server 120 may control an avatar of the user A to perform an action of "smiley face" for the user's avatar. A plurality of words may be stored in association with a single action tag in the word database 2020. As such, an avatar may be controlled to express a corresponding action using an action tag without a need for a user to select an action of the avatar directly.

Figure 21:
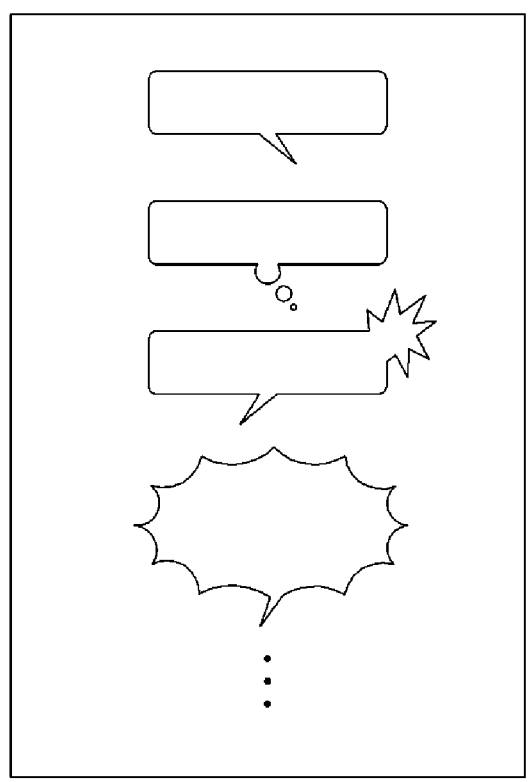
FIG. 21 illustrates speech bubbles in various shapes according to exemplary embodiments of the present invention.

FIG. 21 illustrates speech bubbles 2100 in various shapes according to exemplary embodiments of the present invention. In the chat service, a speech bubble from among the speech bubbles 2100 in various shapes may be selected to be used based on a user preference. The speech bubble may be transformed based on a command, such as, a keyboard command. For example, a speech bubble may be associated with an exclamation mark, a question mark, or the like. When the exclamation mark or the question mark is included in chat content of a user, a corresponding speech bubble may be selected automatically by the application or server.

Figure 22:
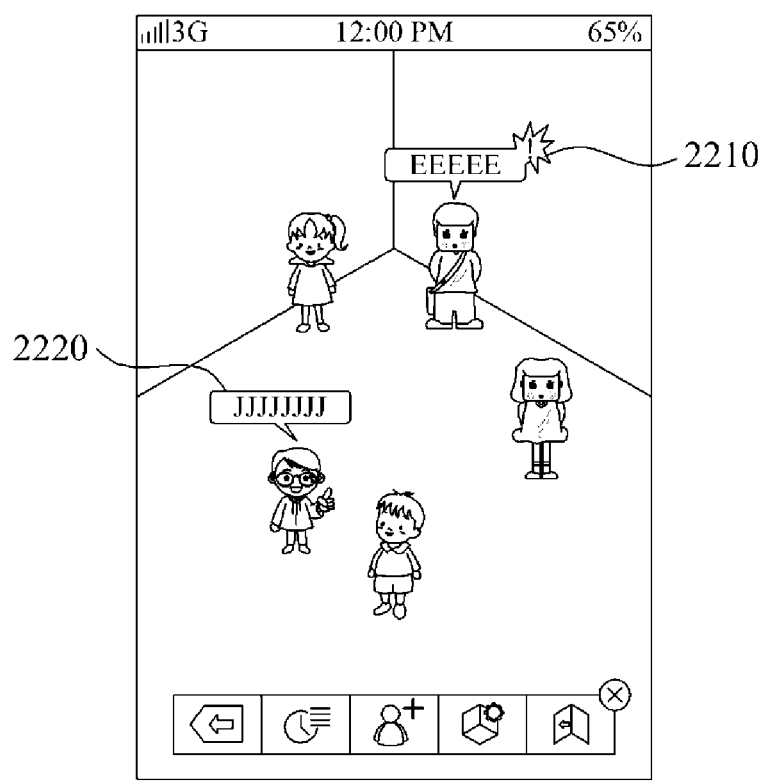
FIG. 22 illustrates speech bubbles in various shapes used according to exemplary embodiments of the present invention.

FIG. 22 illustrates speech bubbles of various shapes used according to exemplary embodiments of the present invention. A screen 2200 is an example of a screen displayed on a terminal. A first speech bubble 2210 may display a speech bubble that is provided automatically based on an exclamation mark, when the exclamation mark is included in chat content input. A second speech bubble 2220 may display a speech bubble provided after being directly selected by a user.

Figure 23:
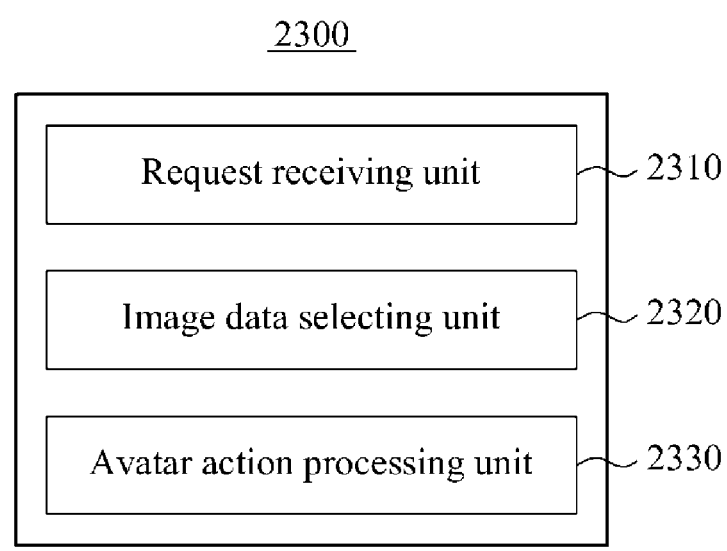
FIG. 23 illustrates an inner configuration of an avatar service system according to exemplary embodiments of the present invention.

FIG. 23 illustrates an inner configuration of an avatar service system according exemplary embodiments of the present invention. An avatar service system 2300 may be a system corresponding to the server 120 described in FIG. 1, and may provide an avatar service to a user. The avatar service system 2300 may include a request receiving unit 2310, an image data selecting unit 2320, and an avatar action processing unit 2330 as shown in FIG. 23.

The request receiving unit 2310 may receive a request for an avatar to perform an action from a terminal over a network. The action of the avatar may be an animation including a plurality of frames to express a motion, a facial expression, an emotion, and the like.

The image selecting unit 2320 may select image data for a plurality of body layers forming a body of the avatar in response to the request. The image selecting unit 2320 may select image data for a plurality of item layers disposed on the body of the avatar based on the selected image data. The avatar service system 2300 may select an appropriate item layer based on an action of the body layer and an action of an avatar. As the avatar service system 2300 selects and combines an item layer based on the body layer selected, an issue of a broken image may be prevented when an avatar is provided in a mobile environment.

The avatar action processing unit 2330 may generate action data for applying an action of an avatar to the avatar based on the selected image data, and may provide the generated action data to the terminal.

In exemplary embodiments of the present invention, the avatar action processing unit 2330 may generate an animation based on an action of an avatar by combining the selected image data for the plurality of frames through metadata based on the requested action of the avatar. The avatar action processing unit 2330 may provide the generated animation to a terminal as action data. The avatar service system 2300 may generate an animation and provide the generated animation to a terminal.

The avatar action processing unit 2330 may generate, as action data, data including the selected image data and metadata based on a requested action of an avatar to combine the selected image data for a plurality of frames, and may provide the generated action data to a terminal. An animation based on the action of the avatar may be generated, and the action of the avatar may be processed through the generated animation being played via a screen of the terminal. An animation may be generated in a terminal.

An avatar may at least include a gender property and a species property, and the species property may at least include an animal species. The avatar service system 2300 may provide an avatar in another species, aside from a human avatar, such as the animal species. As necessary, the species property may include a virtual species.

The request receiving unit 2310 may receive a randomly combined request from a terminal. The avatar action processing unit 2330 may generate preview data based on at least one item layer selected at random from item layers included in all item layers or a category in response to the randomly combined request. The avatar action processing unit 2330 may provide the preview data to the terminal. The at least one item layer being disposed on the avatar based on the preview data may be displayed via a screen of the terminal. A user of the terminal may be able to view various items by randomly putting the various items on an avatar of the user.

A service provided in a mobile environment may include a chat service. The avatar service system 2300 may store and maintain an image set with respect to a user of a terminal. The avatar action processing unit 2330 may include an image providing unit (not shown) that provides the image set with respect to the user when the chat service is being provided. The provided image may be displayed on a screen of the terminal when the chat service is being executed. The chat service may display an image of a user in a chat room together with an image of a counterpart unlike a conventional chat service displaying only the image of the counterpart.

An item layer may include a mobile device layer for providing an image in which an avatar is represented in a vehicle. When the vehicle layer is disposed on the avatar, and an action of the avatar is set to be in "movement", the avatar may move with the vehicle layer disposed on the avatar, on a screen of a terminal. As described in the preceding with reference to FIG. 15, an avatar may be able to perform an action or be set to be in "movement" while being represented in the vehicle. For example, when a service provided in a mobile environment is a chat service, a user may perform a chat while moving an avatar represented in a mobile device in a chat room.

The image data selecting unit 2320 may further select image data with respect to a pet set to be associated with an avatar. The avatar action processing unit 2330 may generate action data further using the selected image data with respect to the pet.

For example, the image data selecting unit 2320 may select at least one of a plurality of image data pre-stored with respect to a pet based on at least one of an action of an avatar, an input of a user in a terminal, and an action of a pet selected by a user in a terminal. The pet set to be associated with the avatar may be moved or may perform an action. A movement or an action of the pet may be determined based on an action of, for example, an avatar, an input of a user, chat content, or an action of a pet selected by a user.

The movement or the action of the pet may be displayed on a screen of the terminal through an animation generated based on the action data. The action of the pet may be displayed in conjunction with the action of the avatar on the screen based on the action of the avatar. The movement or the action of the pet may be controlled to be displayed on the screen separately, independent of the avatar, based on an input or a selection of the user.

Figure 24:
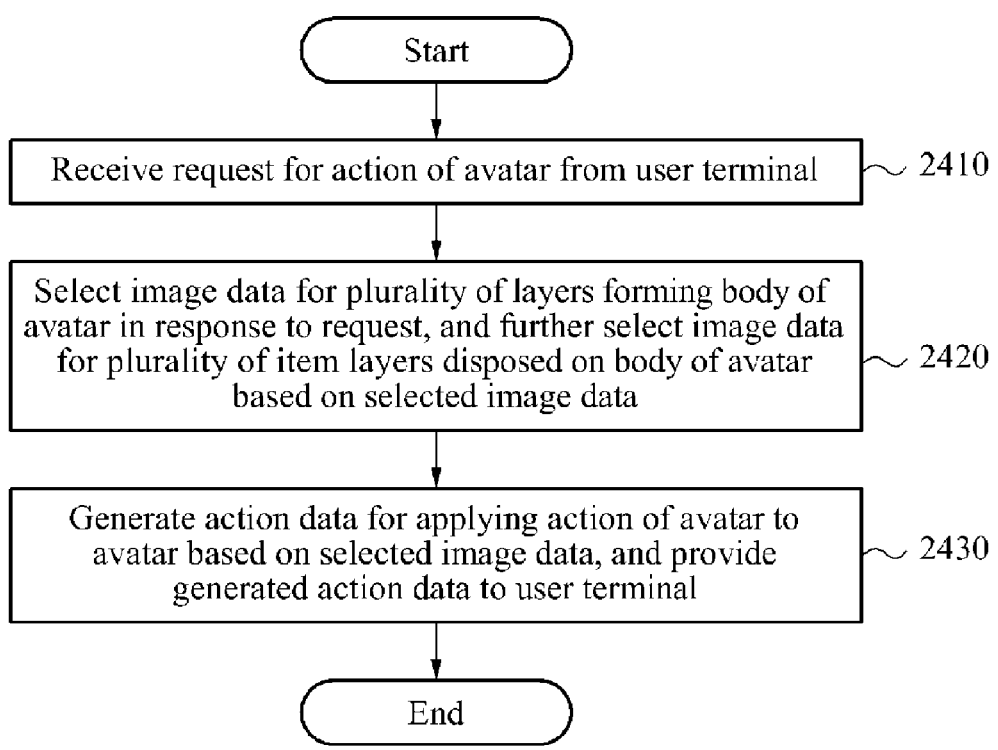
FIG. 24 illustrates an avatar service method conducted by an avatar service system according to exemplary embodiments of the present invention.

FIG. 24 is a flowchart illustrating an avatar service method conducted by the avatar service system according to exemplary embodiments of the present invention. An avatar service method may be conducted by the avatar service system 2300 described in FIG. 23.

In operation 2410, the avatar service system 2300 may receive a request for an avatar to perform an action from a terminal. The action of the avatar may be an animation including a plurality of frames to express a motion, a facial expression, an emotion, and the like.

In operation 2420, the avatar service system 2300 may select image data for a plurality of body layers forming a body of an avatar in response to the request. The avatar action processing system 2300 may select image data for a plurality of item layers disposed on the body of the avatar based on the selected image data.

In operation 2430, the avatar service system 2300 may generate action data for applying an action of an avatar to the avatar based on the selected image data, and may provide the generated action data to a terminal.

In exemplary embodiments of the present invention, the avatar service system 2300 may generate an animation based on an action of an avatar by combining the selected image data for a plurality of frames through metadata based on the requested action of the avatar. The avatar service system 2300 may provide the generated animation to a terminal as action data. The avatar service system 2300 may generate an animation and provide the generated animation to a terminal.

The avatar service system 2300 may generate, as action data, data including the selected image data and metadata based on the requested action of an avatar to combine the selected image data for a plurality of frames. The avatar service system 2300 may provide the generated action data to a terminal. An animation based on the action of the avatar may be generated based on the action data in the terminal, and the action of the avatar may be processed through the generated animation being played via a screen of the terminal. An animation may be generated in a terminal.

An avatar may at least include a gender property and a species property, and the species property may at least include one animal species. The avatar service system 2300 may provide an avatar in another species aside from a human avatar, such as the animal species. As necessary, the species property may include a virtual species.

The avatar service system 2300 may receive a randomly combined request from a terminal. The avatar service system 2300 may generate preview data based on at least one item layer selected at random from among item layers included in all item layers. The avatar service system 2300 may generate preview data based on a category in response to the randomly combined request, and may provide the preview data to the terminal. The at least one item layer being disposed on the avatar based on the preview data may be displayed via a screen of the terminal. A user of the terminal may be able to view various items by randomly putting the various items on an avatar of the user as necessary.

A service provided in a mobile environment may include a chat service. The avatar service system 2300 may store and maintain an image set with respect to a user of a terminal, and may include providing an image set (not shown) with respect to the user to the terminal when the chat service is being provided. The provided image may be displayed on a screen of the terminal when the chat service is being executed. The chat service may display an image of a user in a chat room together with an image of a counterpart unlike a conventional chat service displaying only the image of the counterpart.

An item layer may include a mobile device layer for providing an image in which an avatar is represented in a vehicle. When the vehicle layer is disposed on the avatar, and an action of the avatar is set to be in "movement", the avatar may move with the vehicle layer disposed on the avatar on a screen of a terminal. As described in the preceding with reference to FIG. 15, an avatar may be able to perform an action or be set to be in "movement" while being represented in the vehicle. For example, when a service provided in a mobile environment is a chat service, a user may perform a chat while moving an avatar represented in a vehicle in a chat room.

The avatar service system 2300 may further select image data with respect to a pet set to be associated with an avatar. The avatar service system 2300 may generate action data using the selected image data with respect to the pet.

The avatar service system 2300 may select at least one of a plurality of image data pre-stored with respect to a pet based avatar on at least one of an action of an avatar, an input of a user in a terminal, and an action of a pet selected by a user in a terminal. The pet set to be associated with the avatar may be moved or may perform an action. a movement or an action of the pet may be determined based on an action of, for example, an avatar, an input of a user, chat content, or an action of a pet selected by a user from among various actions of a pet.

The movement or the action of the pet may be displayed on a screen of the terminal through an animation generated based on the action data. The action of the pet may be displayed in conjunction with the action of the avatar on the screen based on the action of the avatar. The movement or the action of the pet may be controlled to be displayed on the screen separately, independent of the avatar, based on an input or a selection of the user.

Figure 25:
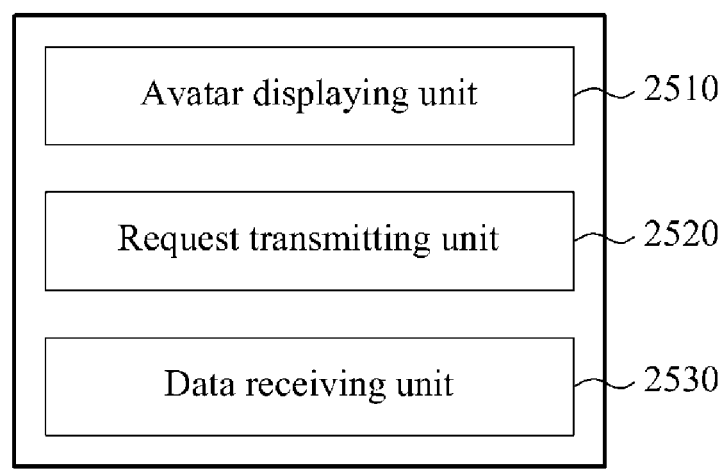
FIG. 25 illustrates an inner configuration of a terminal according to exemplary embodiments of the present invention.

FIG. 25 illustrates an inner configuration of a terminal according to exemplary embodiments of the present invention. A terminal 2500 may be an apparatus corresponding to the terminal 110 described in FIG. 1, and may be an apparatus provided with an avatar in a service provided in a mobile environment. The terminal 2500 may include an avatar displaying unit 2510, a request transmitting unit 2520, and a data receiving unit 2530 as shown in FIG. 25.

The avatar displaying unit 2510 may display an avatar on a screen. When a user connects to an avatar service through the terminal 2500, the terminal 2500 may receive information on an avatar of the user from a server. The avatar displaying unit 2510 may display an avatar on a screen based on the information on the avatar. The server may correspond to the avatar service system 2300 described in FIG. 23.

The request transmitting unit 2520 may transmit a request for an avatar to perform an action to the server. In response to the request, image data may be selected for a plurality of body layers forming a body of an avatar, and image data may further be selected for a plurality of item layers disposed on the body of the avatar based on the selected image data. As an item layer is selected and combined based on a selected body layer, an appropriate item layer may be selected based on an action of the body layer and an issue of a broken image may be prevented when an avatar is provided in a mobile environment.

The data receiving unit 2530 may receive action data for the action of the avatar from the server. The action data for applying the action of the avatar to the avatar may be generated based on the image data selected in the server.

In exemplary embodiments of the present invention, an animation based on an action of an avatar may be generated as action data by combining the selected image data for a plurality of frames through metadata based on the requested action of the avatar. The avatar displaying unit 2510 may process the action of the avatar by playing the animation received as the action data via a screen.

In exemplary embodiments of the present invention, data including the selected image data and metadata based on the requested action of an avatar to combine the selected image data for a plurality of frames may be generated in a server as action data. The terminal 2500 may further include an animation generating unit (not shown) that generates an animation based on the action of the avatar based on the metadata and the selected image data. The animation may be generated in the terminal 2500. The avatar displaying unit 2510 may process the action of the avatar by playing the generated animation via a screen.

An avatar may at least include a gender property and a species property, and the species property may at least include an animal species. The terminal 2500 may provide an avatar in another species aside from a human avatar, such as the animal species. As necessary, the species property may include a virtual species.

The request transmitting unit 2520 may further transmit a randomly combined request to a server based on an input of a user. The data receiving unit 2530 may receive preview data generated in the server based on at least one item layer selected at random from among item layers included in all item layers or a category in response to the randomly combined request. The avatar displaying unit 2510 may further display the at least one item layer being disposed on the avatar based on the preview data via a screen. The user may be able to view various items by randomly putting the various items on the avatar.

A service provided in a mobile environment may include a chat service. The data receiving unit 2530 may further receive an image set with respect to a user from a server when the chat service is being provided, and the avatar displaying unit 2510 may further display the received image on a screen when the chat service is being provided. The chat service according to the exemplary embodiments of the present invention may display an image of the user together with an image of a counterpart in a chat room unlike a conventional chat service displaying only the image of the counterpart.

An item layer may include a mobile device layer for providing an image in which an avatar is represented in a vehicle. When the vehicle layer is disposed on the avatar, and an action of the avatar is set to be in "movement", the avatar may move with the vehicle layer on a screen of a terminal. As described in the preceding with reference to FIG. 15, an avatar may be able to perform an action or be set to be in "movement" while being represented in the vehicle. When a service provided in a mobile environment is a chat service, a user may perform a chat while moving an avatar represented in a vehicle.

Also, the image data with respect to a pet set to be associated with an avatar may further be selected in a server. Action data may be generated in the server using the selected image data with respect to the pet.

The image data with respect to the pet may be selected from among image data pre-stored with respect to the pet and based on at least one of an action of an avatar, an input of a user, and an action of the pet selected by the user. The pet set to be associated with the avatar may be moved or may perform an action. A movement or an action of the pet may be determined based on an action of, for example, an avatar, an input of a user, chat content, or an action of a pet selected by a user from among various actions of a pet provided by an application installed on a terminal.

The movement or the action of the pet may be displayed on a screen through an animation generated based on the action data. The action of the pet may be displayed in conjunction with the action of the avatar on the screen based on the action of the avatar. The movement or the action of the pet may be controlled to be displayed on the screen separately, independent from the avatar, based on an input or a selection of the user.

Figure 26:
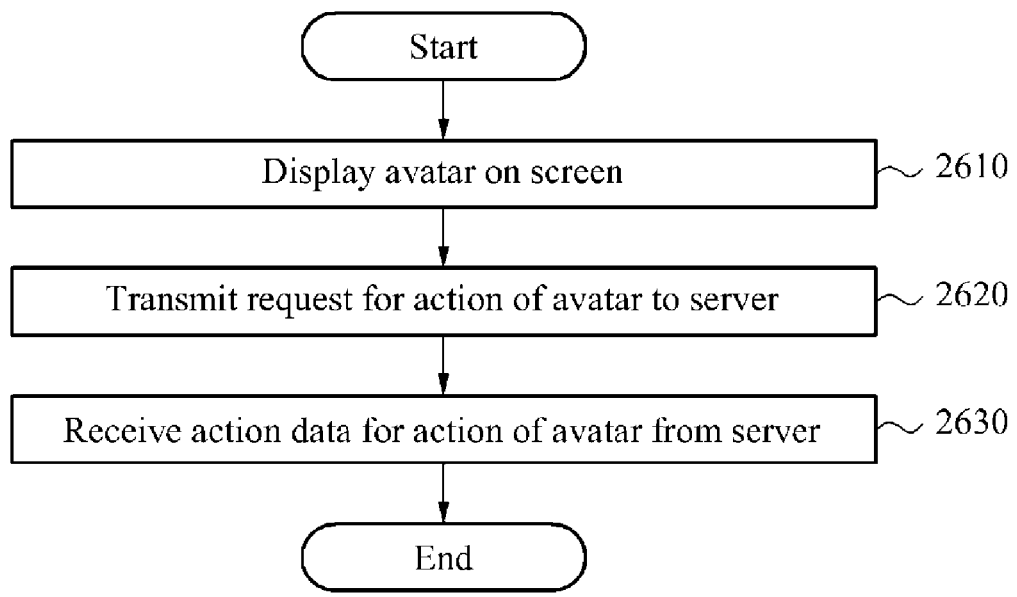
FIG. 26 illustrates an avatar service method conducted by a terminal according to exemplary embodiments of the present invention.

FIG. 26 illustrates an avatar service method conducted by a terminal according to exemplary embodiments of the present invention. The avatar service method may be conducted through a terminal 2500 described in FIG. 25.

In operation 2610, the terminal 2500 may display an avatar on a screen. When a user connects to an avatar service through the terminal 2500, the terminal 2500 may receive information on the avatar of the user from a server. The terminal 2500 may display the avatar on a screen based on the information on the avatar. The server may correspond to the avatar service system 2300 described in FIG. 23.

In operation 2620, the terminal 2500 may transmit a request for an avatar to perform an action to the server. In response to the request, image data may be selected for a plurality of body layers forming a body of the avatar, and image data may be selected for a plurality of item layers disposed on the body of the avatar based on the selected image data. Since an item layer is selected and combined based on the selected body layer, an appropriate item layer may be selected based on an action of the body layer, an action of an avatar, such that an issue of a broken image may be prevented when the avatar is provided in a mobile environment.

In operation 2630, the terminal 2500 may receive action data for the action of the avatar from the server. The action data for applying the action of the avatar to the avatar may be generated based on the image data selected in the server.

In exemplary embodiments of the present invention, an animation based on an action of an avatar may be generated as action data by combining the selected image data for a plurality of frames through metadata based on the requested action of the avatar. The terminal 2500 may process the action of the avatar by playing the animation received as the action data via a screen.

In exemplary embodiments of the present invention, data including the selected image data and metadata based on the requested action of the avatar to combine the selected image data for a plurality of frames may be generated in a server as action data. The terminal 2500 may further include generating an animation (not shown) based on the action of the avatar, based on the metadata and the selected image data. An animation may be generated in the terminal 2500. The terminal 2500 may process the action of the avatar by playing the generated animation via a screen.

An avatar may at least include a gender property and a species property, and the species property may at least include an animal species. The terminal 2500 may provide an avatar in another species aside from a human avatar, such as the animal species. As necessary, the species property may include a virtual species.

The terminal 2500 may further transmit a randomly combined request to a server based on an input of a user. The terminal 2500 may further receive preview data generated in the server based on at least one item layer selected at random from among item layers included in all item layers or a category in response to the randomly combined request. The terminal 2500 may further display the at least one item layer being disposed on the avatar based on the preview data via a screen. The user may be able to view various items by randomly putting the various items on an avatar of the user.

A service provided in a mobile environment may include a chat service. The terminal 2500 may receive an image set with respect to a user from a server when the chat service is being provided, and may further display the received image on a screen when the chat service is being provided. The chat service may display an image of the user along with an image of a counterpart in a chat room unlike a conventional chat service displaying only the image of the counterpart.

An item layer may include a mobile device layer for providing an image in which an avatar is represented in a vehicle. When the vehicle layer is disposed on the avatar and an action of the avatar is set to be in "movement," the avatar may move with the vehicle layer on a screen of a terminal. As described in the preceding with reference to FIG. 15, an avatar may be able to perform an action or be set to be in "movement" while being represented in the vehicle. For example, when a service provided in a mobile environment is a chat service, a user may perform a chat while moving an avatar represented in a vehicle in a chat room.

Also, the image data with respect to a pet set to be associated with an avatar may further be selected in a server. Action data may be generated in the server further using the selected image data with respect to the pet.

The image data with respect to the pet may be selected from among a plurality of image data pre-stored with respect to the pet based on at least one of an action of an avatar, an input of a user, and an action of the pet selected by the user. The pet set to be associated with the avatar may be moved or may perform an action. In this example, a movement or an action of the pet may be determined based on an action of, for example, an avatar, an input of a user, chat content, or an action of a pet selected by a user from among various actions of the pet provided by an application installed on a terminal.

The movement or the action of the pet may be displayed on a screen through an animation generated based on the action data. For example, the action of the pet may be displayed together with the action of the avatar on the screen based on the action of the avatar. As another example, the movement or the action of the pet may be controlled to be displayed on the screen separately, independent of the avatar, based on an input or a selection of the user.

For any descriptions omitted in FIGS. 23 to 26, reference may be made to analogous features described in FIGS. 1 to 22.

According to exemplary embodiments of the present invention, it is possible to store and maintain metadata for representing an action and a plurality of rotated images based on an action for a plurality of layers forming an avatar in a database respectively, and to express an action such as various motions or an emotion of an avatar by providing the metadata and the plurality of rotated images suitable for the action in response to a request.

According to exemplary embodiments of the present invention, it is possible to resolve an issue of a broken image due to a rotated image and improve an overall quality of an avatar service, by forming additional item layers for items, such as, an accessory, clothes, and the like, to be added to an avatar, as well as layers forming a body of the avatar, and by generating and maintaining a plurality of rotated images for a plurality of additional item layers to provide the plurality of rotated images for the plurality of additional item layers suitable for actions of layers forming the body.

According to exemplary embodiments of the present invention, it is possible to engage an interest of the user by enabling a user to select an avatar in a chat service and by expanding a range of maximizing the avatar, to express various emotions of the user realistically through an action of the avatar rather than a static text-based chat, and to give vitality to chatting.

According to exemplary embodiments of the present invention, it is possible to provide users with a service that enables a random chat with all other users through a random chat function, to verify a previous chat or an action of an avatar through an additional chat log while using the avatar, and to give vitality to chatting by allowing the avatar to move.

According to exemplary embodiments of the present invention, it is possible to automatically express an action such as an emotion or a motion of an avatar by identifying a word among chat content, to provide a speech bubble subject to change according to the chat content rather than an identical speech bubble, and to allow a user to select the speech bubble of the user.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An avatar service system for providing an avatar in a service provided in a mobile environment, the system comprising:
    a request receiving unit configured to receive a request for an avatar to perform an action;
    an image data selecting unit configured to select image data and metadata for body layers forming a body of the avatar from a database, in response to the request, and based on the selected body image data configured to further select image data and metadata for item layers disposed on the body of the avatar from the database; and
    an avatar action processing unit configured to generate action data to apply the action to the avatar based on the selected image data and metadata,
    wherein the metadata for body layers includes a plurality of different body layers each representing a different body part, with each of said body layers including a plurality of rotated images in which the relevant body part is rotated about an associated control axis by a particular angle, and further wherein said plurality of rotated images for a plurality of particular angles are stored in the database.

2. The system of claim 1, wherein the avatar action processing unit is further configured to combine the selected image data for frames through metadata to generate an animation as the action data.

3. The system of claim 1, wherein the avatar action processing unit is further configured to combine the selected image data and metadata to generate frames as the action data.

4. The system of claim 3, wherein an animation is generated in a terminal based on the action data, and the terminal plays the generated animation via a screen of the terminal.

5. The system of claim 1, wherein the avatar comprises a gender property and a species property, and the species property comprises an animal species.

6. The system of claim 1, wherein the request receiving unit further receives a randomly combined request comprising a category for providing preview data, and
    the avatar action processing unit generates the preview data based on at least one item layer selected at random from item layers associated with the category.

7. The system of claim 6, wherein the preview data is displayed via a screen and the display comprises a state of the at least one item layer being disposed on the avatar.

8. The system of claim 1, wherein the service provided in the mobile environment comprises a chat service, and the system further comprises:
    an image providing unit configured to store and maintain an image set associated with a chat user, and further configured to provide the image set associated with the chat user to a terminal when the chat user uses the chat service.

9. The system of claim 8, wherein the provided image set is displayed on the screen of a terminal when the chat service is being provided.

10. The system of claim 1, wherein one of the item layers comprises a vehicle layer for representing the avatar in a vehicle, and
    when the vehicle layer is disposed on the avatar and the action of the avatar is indicated to be in movement, the avatar moves with the vehicle layer on the screen of a terminal.

11. The system of claim 1, wherein the image selecting unit further selects image data with respect to a pet associated with the avatar, and
    the avatar action processing unit generates the action data using the selected pet image data.

12. The system of claim 11, wherein the image selecting unit selects pre-stored pet image data, based on at least one of the action of the avatar, an input of a user, and a selected action of the pet.

13. The system of claim 11, wherein a movement or the action of the pet is displayed on a screen of a terminal through an animation generated with the action data.

14. An avatar service method to be executed on a computer for providing an avatar in a service provided in a mobile environment, the method comprising:
    receiving a request for an avatar to perform an action;
    selecting, with the computer, image data and metadata for body layers forming a body of the avatar in response to the request, and based on the selected body image data further selecting image data and metadata with respect to item layers disposed on the body of the avatar; and
    generating action data for applying the action to the avatar based on the selected image data and metadata, wherein the metadata for body layers includes a plurality of different body layers each representing a different body part, with each of said body layers including a plurality of rotated images in which the relevant body part is rotated about an associated control axis by a particular angle, and further wherein said plurality of rotated images for a plurality of particular angles are stored in the database.

15. The method of claim 14, wherein the generating of the action data comprises combining the selected image data for frames through metadata based on the action of the avatar to generate an animation as the action data.

16. The method of claim 14, wherein the generating comprises combining the selected image data and metadata to generate frames as the action data.

17. An avatar service method performed by a terminal provided with an avatar in a service provided in a mobile environment, the method comprising:

displaying an avatar on a screen;

transmitting a request to a server for the avatar to perform an action; and receiving action data for the action of the avatar from the server, wherein in response to the request, the server selects image data and metadata for body layers forming a body of the avatar, and based on the selected body image data the server further selects image data and metadata for item layers disposed on the body of the avatar, and the server generates action data based on the selected image data for applying the action to the avatar, wherein the metadata for body layers includes a plurality of different body layers each representing a different body part, with each of said body layers including a plurality of rotated images in which the relevant body part is rotated about an associated control axis by a particular angle, and further wherein said plurality of rotated images for a plurality of particular angles are stored in the database.

18. The method of claim 17, wherein an animation based on the action of the avatar is generated by the server by combining the selected image data for frames through metadata.

19. The method of claim 17, wherein the action data comprising the selected image data and the metadata based on the requested action of the avatar the server combines the selected image data for frames to generate an animation as the action data.

20. A non-transitory computer-readable storage media having stored thereon a computer program that, when executed by a terminal comprising a display and one or more processors, causes the one or more processors to perform acts that provide an avatar in a service in a mobile environment, the acts comprising:

displaying an avatar on a screen;

transmitting a request to a server for the avatar to perform an action; and receiving action data for the action of the avatar from the server, wherein in response to the request, the server selects image data and metadata for body layers forming a body of the avatar, and based on the selected body image data the server further selects image data and metadata for item layers disposed on the body of the avatar, and the server generates action data based on the selected image data for applying the action to the avatar, wherein the metadata for body layers includes a plurality of different body layers each representing a different body part, with each of said body layers including a plurality of rotated images in which the relevant body part is rotated about an associated control axis by a particular angle, and further wherein said plurality of rotated images for a plurality of particular angles are stored in the database.

\* \* \* \* \*